United States Patent [19]
Knies et al.

[11] Patent Number: 5,889,109
[45] Date of Patent: Mar. 30, 1999

[54] SILICONE RUBBERS WITH IMPROVED MOLD RELEASE PROPERTIES

[75] Inventors: Wolfgang Knies, Burghausen; Werner Guske, Kirchdorf/Inn, both of Germany

[73] Assignee: Wacker-Chemie GmbH, Munich, Germany

[21] Appl. No.: 719,051

[22] Filed: Sep. 24, 1996

[30] Foreign Application Priority Data

Oct. 19, 1995 [DE] Germany .................. 195 39 031.8

[51] Int. Cl.$^6$ .................................................... C08J 83/08
[52] U.S. Cl. ........................... 524/869; 524/860; 528/24
[58] Field of Search .................................... 524/862, 860, 524/869; 528/24

[56] References Cited

U.S. PATENT DOCUMENTS 4,618,639  10/1986  Takahashi et al. .................. 524/262
4,771,099   9/1988  Jtoh et al. .

FOREIGN PATENT DOCUMENTS 0651020  5/1995  European Pat. Off. .

OTHER PUBLICATIONS

Derwent Abstract AN 80–47082C [27].

Derwent Abstract AN 79–47660 B [26].

*Primary Examiner*—Robert Dawson
*Assistant Examiner*—D. Aylward
*Attorney, Agent, or Firm*—Brooks & Kushman P.C.

[57] ABSTRACT

The invention relates to polyorganosiloxane rubber compositions which vulcanize to elastomers under the influence of heat and comprise A) 100 parts by weight of organopolysiloxane,
  B) 10 to 200 parts by weight of filler,
  C) 0.1 to 10 parts by weight of crosslinking agent which forms free radicals and
  D) 0.05 to 10 parts by weight of aliphatic alcohol with $C_8$- to $C_{30}$-alkyl radicals.

The aliphatic alcohol (D) acts as an internal mold release agent.

10 Claims, No Drawings

SILICONE RUBBERS WITH IMPROVED MOLD RELEASE PROPERTIES

FIELD OF INVENTION

The present invention relates to polyorganosiloxane rubber compositions which vulcanize to elastomers under the influence of heat and comprise an aliphatic alcohol as an internal mold release agent, and to a process for the production of elastomer shaped articles from these polyorganosiloxane rubber compositions.

BACKGROUND OF INVENTION

Various additives for improving release from the mold are customary in the silicone rubber industry. The additives are either sprayed on the surface of the metal molds as external mold release agents, or added as internal mold release agents to the rubber to be processed.

Aqueous solutions of soaps are often used as external mold release agents for polysiloxane rubber compositions which vulcanize to elastomers under the influence of heat. They have the disadvantage that in the course of time they form a deposit on the mold surface, which leads to surface defects on the shaped object, therefore they have to be cleaned often.

Fatty acids or metal salts thereof are used as internal mold release agents for polysiloxane rubber compositions which vulcanize to elastomers under the influence of heat. However, mechanical properties in the polysiloxane rubber compositions are impaired as a result. In particular, the compression set, which represents the restoring force of the vulcanizate after exposure to heat, is increased. A low compression set is important for sealing components. Furthermore, fatty acids, and especially metal salts thereof, cause discoloration of the vulcanizate. The metal salts of the fatty acids are insoluble in the polysiloxane rubber compositions and therefore reduce their transparency.

EP-A-651 020 describes the use of fatty acids or metal salts thereof in combination with water as internal mold release agents. Although the water improves the mold release properties, it leads to blisters in the rubber during vulcanization. In addition, such mixtures lose the water as storage time lengthens.

SUMMARY OF INVENTION

The object of the present invention is to provide polyorganosiloxane rubber compositions which vulcanize under the influence of heat to give elastomers which can easily be removed from the mold, where the elastomers have good mechanical properties and are not impaired in their optical properties.

The present invention relates to polyorganosiloxane rubber compositions which vulcanize to elastomers under the influence of heat and comprise A) 100 parts by weight of organopolysiloxane built up from units of formula

in which
R is identical or different monovalent SiC-bonded $C_1$- to $C_{18}$-hydrocarbon radicals which are optionally substituted by halogen atoms or cyano groups and a has the values 0, 1, 2 or 3, on average 1.95 to 2.05, B) 10 to 200 parts by weight of filler, C) 0.1 to 10 parts by weight of crosslinking agent which forms free radicals and D) 0.05 to 10 parts by weight of aliphatic alcohol with $C_8$- to $C_{30}$-alkyl radicals.

The organopolysiloxane (A) has a viscosity of $0.1 \times 10^6$ to $100 \times 10^6$ mPa.s at 25° C., preferably $1 \times 10^6$ to $20 \times 10^6$ mPa.s at 25° C. Preferably, a is on average 1.98 to 2.02.

Examples of radicals R are alkyl radicals, such as the methyl, ethyl, n-propyl, iso-propyl, n-butyl, iso-butyl, tert-butyl, n-pentyl, iso-pentyl, neo-pentyl and tert-pentyl radical; hexyl radicals, such as the n-hexyl radical; heptyl radicals, such as the n-heptyl radical; octyl radicals, such as the n-cotyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; alkenyl radicals, such as the vinyl and the allyl radical; cycloalkyl radicals, such as cyclopentyl, cyclohexyl and cycloheptyl radicals, and methylcyclohexyl radicals; aryl radicals, such as the phenyl, naphthyl and anthryl and phenanthryl radical; alkaryl radicals, such as o-, m- and p-tolyl radicals, xylyl radicals and ethylphenyl radicals; and aralkyl radicals, such as the benzyl radical and the α- and the β-phenylethyl radical.

Examples of substituted radicals R are cyanoalkyl radicals, such as the β-cyanoethyl radical, and halogenated hydrocarbon radicals, for example haloaryl radicals, such as the 3,3,3-trifluoro-n-propyl radical, the 2,2,2,2', 2',2'-hexafluoroisopropyl radical and the heptafluoroisopropyl radical, and halogenoaryl radicals, such as the o-, m- and p-chlorophenyl radical.

A diorganopolysiloxane of the formula

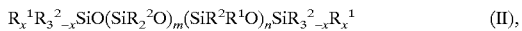

in which
$R^1$ is identical or different monovalent, SiC-bonded, unsaturated $C_1$- to $C_6$- alkyl radicals,
$R^2$ is identical or different monovalent SiC-bonded saturated $C_1$- to $C_{18}$-alkyl radicals which are optionally substituted by halogen atoms or cyano groups or $C_6$- to $C_{18}$-aryl radicals which are optionally substituted by halogen atoms or cyano groups,
m is an integer from 100 to 20,000
n is 0 or an integer from 1 to 200 and
x is 0 or 1,
is preferably used as organopolysiloxane (A).

In addition to the diorganosiloxane units ($SiR_2O$), other siloxane units can also be present within or along the siloxane chains of formula II. Examples of such other siloxane units, which are usually present merely as impurities, are those of the formulae $R^2SiO_{3/2}$, $R_3^2SiO_{1/2}$, and $SiO_{4/2}$, in which $R^2$ has the meaning given above. The amount of such other siloxane units as diorganosiloxane units, however, is preferably not more than 10 mol percent, in particular not more than 1 mol percent, in each case based on the weight of diorganopolysiloxane (A).

Examples of radicals $R^1$ are alkenyl radicals, such as the vinyl radical, allyl radical and cyclohexenyl radical, the vinyl radical being preferred.

Examples of radicals $R^2$ are the saturated $C_1$–$C_{18}$-alkyl radicals which are optionally substituted by halogen atoms or cyano groups and are listed above for the radicals R, and the $C_6$-$C_{18}$-aryl radicals optionally substituted by halogen atoms or cyano groups.

Preferred examples of the radical $R^2$ are $C_{1-8}$-alkyl radicals, in particular the methyl radical, and a $C_6$ aryl radical such as the phenyl radical.

Preferably x has the value 1 and n has a value from 10 to 100. The vinyl radicals are preferably in the terminal units and in the chain.

One type of diorganopolysiloxane (A) can be used, or a mixture of two or more different types of diorganopolysiloxane (A) can also be used.

Examples of fillers (B) are non-reinforcing fillers having a specific surface area (BET) of up to 50 m²/g, such as quartz, diatomaceous earth, calcium silicate, zirconium silicate, zeolites, metal oxide powders, such as aluminium oxides, titanium oxides, iron oxides or zinc oxides or mixed oxides thereof, barium sulfate, calcium carbonate, gypsum and glass powder; and reinforcing fillers having a specific surface area (BET) of more than 50 m²/g, such as silicon dioxide having a specific surface area (BET) of at least 50 m²/g, such as pyrogenically prepared silicic acid, precipitated silicic acid, carbon black, such as furnace black and acetylene black, and silicon/aluminium mixed oxides of high BET surface area.

The fillers (B) mentioned can be hydrophobized by treatment with organosilanes or -siloxanes or by etherification of hydroxyl groups to alkoxy groups. One type of filler (B) can be used, but a mixture of two fillers (B) can also be used.

Pyrogenically prepared silicic acid and precipitated silicic acid having a specific surface area (BET) of at least 50 m²/g, in particular at least 100 m²/g, is used.

Filler (B) is used in amounts of 20 to 100 parts by weight per 100 parts by weight of organopolysiloxane (A).

Crosslinking agents (C) which form free radicals are peroxides, in particular organic peroxides. Examples of such organic peroxides are acyl peroxides, such as dibenzoyl peroxide, bis-(4-chlorobenzoyl) peroxide and bis-(2,4-dichlorobenzoyl) peroxide; alkyl peroxides and aryl peroxides, such as dimethyl peroxide, di-tert-butyl peroxide and dicumyl peroxide; perketals, such as 2,5-bis-(tert-butylperoxy)-2,5-dimethylhexane; and peresters, such as diacetyl peroxydicarbonate and tert-butyl perbenzoate.

Crosslinking agents (C) which form free radicals are used in amounts of 0.1 to 5 parts by weight, preferably 0.2 to 2.0 parts by weight per 100 parts by weight of organopolysiloxane (A).

Aliphatic alcohols (D) which can be used are saturated alcohols, such as 1-n-octanol, 1-n-decanol, stearyl alcohol and 1-n-dodecanol; unsaturated alcohols, such as oleyl alcohol and branched alcohols. The aliphatic alcohols (D) can also be substituted by cyano groups. Monohydric alcohols, dialcohols and polyhydric alcohols can also be used. The hydroxyl group can also be bonded in the alkyl chain.

Monohydric alcohols, in particular n-alcohols, are used. The alcohols (D) preferably have 10 to 20 carbon atoms. The alcohols are preferably saturated.

Preferably 1-n-dodecanol, 1-n-tetradecanol, 1-n-hexadecanol and stearyl alcohol are used.

One alcohol can be used, or a mixture of various alcohols can also be used. In the case of mixtures, the lower mixed melting point has an advantageous effect, since liquids can be incorporated more easily into the polyorganosiloxane rubber compositions.

Alcohols (D) are used in amounts of 0.1 to 5 parts by weight, preferably 0.1 to 1.0 part by weight per 100 parts by weight of organopolysiloxane (A).

Up to 30 parts by weight of low-viscosity organosilicon compound (E) are additionally used in the polyorganosiloxane rubber compositions as an antistructuring agent The organosilicon compound (E) has a viscosity of 10 to 100 mPa.s at 25° C., preferably 30 to 60 mPa.s at 25° C.

The organosilicon compound (E) is preferably used in amounts of 0.5 to 20 parts by weight, in particular 1 to 15 parts by weight per 100 parts by weight of organopolysiloxane (A).

The organosilicon compound (E) is one of the formula $$R^3OR_2^4SiO(SiR_2^4O)_pR^3 \qquad (III),$$

in which $R^3$ is a hydrogen atom or a monovalent $C_1$- to $C_4$-hydrocarbon radical, which is optionally interrupted by an ether oxygen atom, $R^4$ has the meaning of R and p is 0 or an integer from 1 to 50.

Examples of radicals $R^3$ are alkyl radicals, such as the methyl, ethyl, n-propyl, iso-propyl, 1-n-butyl, 2-n-butyl, iso-butyl and tert-butyl radical. The methyl and ethyl radical are preferred. Examples of radicals $R^3$ which are substituted by an ether oxygen atom are the methoxyethyl and ethoxyethyl radical.

Examples and preferred examples of radicals $R^4$ are mentioned above.

Preferred organosilicon compounds (E) are, α,ω-dihydroxydimethylpolysiloxanes, having a viscosity of 10 to 120 mPa.s, in particular 30 to 60 mPa.s, at 25° C.

In addition to constituents (A) to (E), substances which are conventionally used in rubber formulations can be mixed into the polyorganosiloxane. Examples of such substances are colored pigments, heat stabilizers, additives for reducing flammability and additives for improving the resistance to oils.

The above mentioned components (A) to (D) can be mixed in any desired sequence for mixing the polyorganosiloxane rubber compositions.

In a preferred embodiment, the components organopolysiloxane (A), fillers (B) and, optionally, organosilicon compound (E) are first mixed and the mixture is subjected to a heat treatment and degassing. Mixing can be carried out in intimate mixers, such as sigma kneaders, kneaders with a stamper, for example a Banbury type, continuous or discontinuous roll mills and single-screw or twin-screw extruders. The components are heated at 100° to 400° C., in particular at 110° to 250° C. The duration of the heating is 15 minutes to 10 hours, preferably 2 to 4 hours, at 140° to 180° C. During the heating, the pressure can be reduced slightly in order to remove volatile compounds.

The aliphatic alcohol (D) is mixed in at 10° to 70° C., in particular below 50° C. The mold release-inhibiting action may be impaired at higher temperatures.

To facilitate handling of the aliphatic alcohol (D) and mixing thereof into the polyorganosiloxane rubber compositions, this can be made into a paste with filler (B), or can be mixed in a high concentration into a polyorganosiloxane rubber base mixture, in order to obtain a so-called masterbatch. However, the aliphatic alcohol (D) can also be admixed as a solution in organic solvents or as an aqueous solution, emulsion or dispersion.

The invention also relates to a process for the production of elastomer shaped articles in which polyorganosiloxane rubber compositions comprising the above mentioned components (A) to (D) are vulcanized in molds at 100°to 400° C.

The vulcanization temperature is preferably 120° to 210° C. The vulcanization time is 1 minute to 3 hours, preferably 5 minutes to 1 hour.

EXAMPLE 0.3% by weight of the mold release agents listed in the following table were mixed into a polydimethylsiloxane rubber Elastosil® R 267/50 (from Wacker-Chemie GmbH, Munich) on a laboratory mill. 0.4% by weight of 2,5-bis (tert-butylperoxy)-2,5-dimethylhexane, in the form of a 45% strength by weight mixture in silicone rubber, was added to the resulting rubbers and vulcanization was carried out at 165° C. for 15 minutes.

TABLE

Properties of Elastosil ® R 267/50 vulcanizate comprising internal mold release agents

| Mold release agent | Stearic acid | Stearyl alcohol | Magnesium stearate |
|---|---|---|---|
| Shore | 54 | 53 | 51 |
| Tear strength (kg/cm$^2$) | 76 | 85 | 83 |
| Elongation at break (%) | 300 | 310 | 300 |
| Rebound resilience (%) | 62 | 67 | 57 |
| Compression set (%) | 25 | 14 | 24 |
| Mold release properties | good | good | good |
| Discoloration (after heat treatment 4 h/200° C. | yellow | unchanged | intensely yellow |

The mold release properties were evaluated manually and the yellow coloration of the vulcanizates was evaluated optically against a vulcanizate without additives.

What is claimed is:

1. A polyorganosiloxane rubber composition which vulcanizes to an elastomer under the influence of heat and comprises
    A) 100 parts by weight of organopolysiloxane built up from units of the formula $$R_a SiO_{\frac{4-a}{2}} \qquad (I)$$

in which
    R is identical or different monovalent SiC-bonded $C_1$- to $C_{18}$-hydrocarbon radicals which are optionally substituted by halogen atoms or cyano groups and
    a has the values 0, 1, 2 or 3, on average 1.95 to 2.05,
    B) 10 to 200 parts by weight of filler,
    C) 0.1 to 10 parts by weight of crosslinking agent which forms free radicals and
    D) 0.05 to 10 parts by weight of monohydric aliphatic alcohol with $C_8$- to $C_{30}$-alkyl radicals.

2. A polyorganosiloxane rubber composition as claimed in claim 1, wherein the organopolysiloxane (A) has a viscosity of 0.1×10$^6$ to 100×10$^6$ mPa.s at 25° C.

3. A polyorganosiloxane rubber composition as claimed in claim 1, wherein the filler is pyrogenically silicic acid and/or precipitated silicic acid having a specific surface area (BET) of at least 50 m$^2$/g.

4. A polyorganosiloxane rubber composition as claimed in claim 1, wherein the crosslinking agent is an organic peroxide.

5. A polyorganosiloxane rubber composition as claimed in claim 1, wherein the aliphatic alcohol (D) is a monohydric alcohol having 10 to 20 carbon atoms.

6. A polyorganosiloxane rubber composition which vulcanizes to an elastomer under the influence of heat and comprises
    A) 100 parts by weight of organopolysiloxane built up from units of the formula $$R_a SiO_{\frac{4-a}{2}} \qquad (I)$$

in which
    R is identical or different monovalent siC-bonded $C_1$- to $C_{18}$-hydrocarbon radicals which are optionally substituted by halogen atoms or cyano groups and
    a has the values 0, 1, 2 or 3, on average 1.95 to 2.05,
    B) 10 to 200 parts by weight of filler,
    C) 0.1 to 10 parts by weight of crosslinking agent which forms free radicals and
    D) 0.05 to 10 parts by weight of aliphatic alcohol with $C_8$- to $C_{30}$-alkyl radicals, and
    E) up to 30 parts by weight of a low-viscosity organosilicon compound antistructuring agent.

7. A process for the production of an elastomer shaped article, comprising; vulcanizing a polyorganosiloxane rubber composition as claimed in claim 1 in a mold at from 100° to 400° C.

8. A polyorganosiloxane rubber composition which vulcanizes to an elastomer under the influence of heat and comprises
    A) 100 parts by weight of organopolysiloxane built up from units of the formula $$R_a SiO_{\frac{4-a}{2}} \qquad (I)$$

in which
    R is identical or different monovalent SiC-bonded $C_1$- to $C_{18}$-hydrocarbon radicals which are optionally substituted by halogen atoms or cyano groups and
    a has the values 0, 1, 2 or 3, on average 1.95 to 2.05,
    B) 10 to 200 parts by weight of filler,
    C) 0.1 to 10 parts by weight of crosslinking agent which forms free radicals and
    D) 0.05 to 10 parts by weight of monohydric or dihydric aliphatic alcohol with $C_8$- to $C_{30}$-alkyl radicals.

9. A process for the production of an elastomer shaped article in which a polyorganosiloxane rubber composition as claimed in claim 6 is vulcanized in a mold at 100° to 400° C.

10. A process for the production of an elastomer shaped article in which a polyorganosiloxane rubber composition as claimed in claim 8 is vulcanized in a mold at 100° to 400° C.

* * * * *